United States Patent
Lee et al.

(10) Patent No.: US 7,499,421 B2
(45) Date of Patent: Mar. 3, 2009

(54) APPARATUS AND METHOD FOR RESOURCE ALLOCATION IN MF-TDMA BROADBAND SATELLITE SYSTEM

(75) Inventors: Ki-Dong Lee, Seoul (KR); Deock-Gil Oh, Daejon (KR); Ho-Jin Lee, Daejon (KR); Kun-Nyeong Chang, Gangwon-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 301 days.

(21) Appl. No.: 11/217,906

(22) Filed: Sep. 1, 2005

(65) Prior Publication Data

US 2006/0126552 A1 Jun. 15, 2006

(30) Foreign Application Priority Data

Dec. 13, 2004 (KR) .................. 10-2004-0104795

(51) Int. Cl.
H04B 7/212 (2006.01)
(52) U.S. Cl. .................. 370/321; 370/337; 370/347; 455/428; 455/12.1
(58) Field of Classification Search .............. 370/321, 370/322, 337, 347, 442, 443, 444, 376, 436, 370/459, 395.21, 236, 236.1; 455/509, 520, 455/422.1, 450, 464; 375/138
See application file for complete search history.

(56) References Cited

U.S. PATENT DOCUMENTS

2002/0176398 A1* 11/2002 Nidda .................. 370/347
2004/0214582 A1* 10/2004 Lan et al. .................. 455/452.2
2005/0005304 A1* 1/2005 Kaul et al. .................. 725/118

FOREIGN PATENT DOCUMENTS

JP 2003032734 1/2003
KR 20030013545 2/2003

OTHER PUBLICATIONS

"An integer programming approach to the time slot assignment problem in SS/TDMA systems with intersatellite links," Lee et al, European Journal of Operational Research 135 (2001), pp. 57-66.
"Time slot assignment in a heterogeneous environment of a SS/TDMA system," Kim et al, International Journal of Satellite Communications 15 (1997), pp. 197-203.

* cited by examiner

Primary Examiner—Nick Corsaro
Assistant Examiner—Shannon R Brooks
(74) Attorney, Agent, or Firm—Ladas & Parry LLP

(57) ABSTRACT

Provided is a resource allocation apparatus and method in a multi frequency-time division multiple access (MF-TDMA) broadband satellite system, which can employ timeslots in a return link with a maximum throughput promptly, by dividing a timeslot assignment problem minimizing a weighted sum in response to a resource allocation request from terminals into a first sub-problem for deciding the number of timeslots to be allocated to each class of each terminal and a second sub-problem for selecting timeslots to be allocated to each terminal. The method includes the steps of accumulating an amount of resource requests created during a super-frame period for each terminal, deciding a resource allocation amount to be allocated to each class, and selecting and mapping timeslots to be allocated to each terminal based on the decided resource allocation amount. This invention may advantageously be applied to the MF-TDMA broadband satellite system.

6 Claims, 2 Drawing Sheets

APPARATUS AND METHOD FOR RESOURCE ALLOCATION IN MF-TDMA BROADBAND SATELLITE SYSTEM

FIELD OF THE INVENTION

The present invention relates to an apparatus and method for resource allocation in a multi frequency-time division multiple access (MF-TDMA) broadband satellite system. More particularly, this invention is directed to a resource allocation apparatus and method in the MF-TDMA broadband satellite system, which divides a timeslot assignment problem minimizing a weighted sum in response to a resource allocation request from terminals into a first sub-problem for deciding the number of timeslots to be allocated to each class of each terminal and a second sub-problem for reallocating timeslots being remained after allocation in the direction of reducing a probability of timeslot loss, and scheduling timeslots in accordance with the decided allocation amount, in an interactive satellite communication system based on the MF-TDMA.

DESCRIPTION OF RELATED ART

As is well known, a frequency resource for allocation comes under a frequency band used in a return link towards a satellite from terminals, which indicates a finite number of timeslots in the return link of MF-TDMA.

In general, in the resource, i.e., timeslot, allocation of the MF-TDMA, allocation plan is done on a frame or super-frame basis. Each frame has a plurality of timeslots, while each super-frame consists of a multiplicity of frames.

Meanwhile, as prior arts in associated with the resource allocation in a satellite communication system of TDMA, there are a timeslot assignment method in inter-satellite links, a timeslot assignment method for TDMA utilized in a mobile communication system, etc.

This resource assignment method in the satellite communication system presents a resource assignment plan by taking account of a type of each terminal, a service type, a transmission delay and so on. However, the resource assignment method in the satellite communication system as mentioned above does not reflect substantial system constraints but tends to simplify them merely.

That is to say, such method simplifies the number of maximum timeslots, which may be assigned to terminals in a location where no radio wave obstacle exists (clear-sky terminals, which will be called "CS terminals" hereinafter), and also to terminals in a location where there are radio wave obstacles (rain-fade terminals, which will be called "RF terminals" hereinafter), by limiting it within the number of RF traffic timeslots being created by one RF time-frequency block. Rather, it is more substantial to limit the number of maximum timeslots that may be assigned to the CS terminals within the number of CS traffic timeslots created by one CS time-frequency block.

Further, the prior art resource allocation method as mentioned early does not reflect the requirement of quality of service (QoS) well. That is, such method does not reflect the fact that a stability of a system can be improved by maintaining the number of data that is not transmitted but lost below a constant number.

Furthermore, the prior art resource allocation method as mentioned above does not present an efficient scheme for assigning, if available timeslots are more than required demand, surplus timeslots.

Moreover, the existing resource allocation method as mentioned above decides a set of CS traffic timeslots and a set of RF traffic timeslots as provided in a dictionary simply; and but, it may establish a more efficient timeslot allocation system by standardizing the same as a portion of an optimal timeslot allocation model.

In particular, since a frequency bandwidth and a transmission delay in the satellite communication system are relatively wider and longer than those of the mobile communication system, respectively, it needs to extend the length of a frame, to apply a timeslot and packet scheduling in the mobile communication system to the satellite communication system. As a result, this leads to a large increase in the number of timeslots to be scheduled and then makes a scheduling for assigning such timeslots very complex.

Accordingly, in consideration of the above-mentioned problems, that is, in the satellite communication system that may have obstacle factors for radio wave transmission and also various transmission schemes and transmission rates for terminals, there has been required an optimal timeslot allocation method based on the quality of service, which determines the set of CS traffic timeslots, the set of RF traffic timeslots, and the timeslot allocation schedule together.

SUMMARY OF THE INVENTION

It is, therefore, an object of the present invention to provide an apparatus and method for resource allocation in a multi frequency-time division multiple access (MF-TDMA) broadband satellite system, which is capable of employing timeslots in a return link with maximum throughput promptly, by dividing a timeslot assignment problem minimizing a weighted sum in response to a resource allocation request from terminals into a first sub-problem for deciding the number of timeslots to be allocated to each class of each terminal and a second sub-problem for selecting timeslots to be allocated to each terminal based on the decided allocation amount.

The other objectives and advantages of the invention will be understood by the following description and also will be seen by the embodiments of the invention more clearly. Further, the objectives and advantages of the invention will readily be seen that they can be realized by the means and its combination specified in the claims.

In accordance with one aspect of the present invention, there is provided a method of allocating resources in an interactive satellite communication system employing a problem decomposition technique, comprising the steps of: a) accumulating an amount of resource requests being created during a super-frame period for each terminal; b) deciding a resource allocation amount to be allocated to each class of each terminal, depending on a preset weight to minimize a difference from the accumulated resource request amount; and c) selecting and mapping timeslots to be allocated to each terminal based on the decided resource allocation amount.

In accordance with another aspect of the present invention, there is provided an apparatus for allocating resources in an interactive satellite communication system employing a problem decomposition technique, comprising: means for accumulating an amount of resource requests being created during a super frame period for each terminal; a first resource allocation amount decision means for deciding a resource allocation amount to be allocated to each class of each terminal, depending on a preset weighted value to minimize a difference with the accumulated resource request amount;

and a resource allocation means for selecting and mapping timeslots to be allocated to each terminal based on the decided resource allocation amount.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

The above-mentioned objectives, features, and advantages will be apparent by the following detailed description in associated with the accompanying drawings; and, according to this, the technical spirit of the invention will readily be conceived by those skilled in the art to which the invention belongs. Further, in the following description, if it seems that a concrete explanation of the known art used in the invention is unnecessary, because of a possibility that the gist of the invention becomes obscure, such explanation will be omitted for the sake of clearness. Hereinafter, a preferred embodiment of the present invention will be described in detail with reference to the accompanying drawings.

Figure 1:
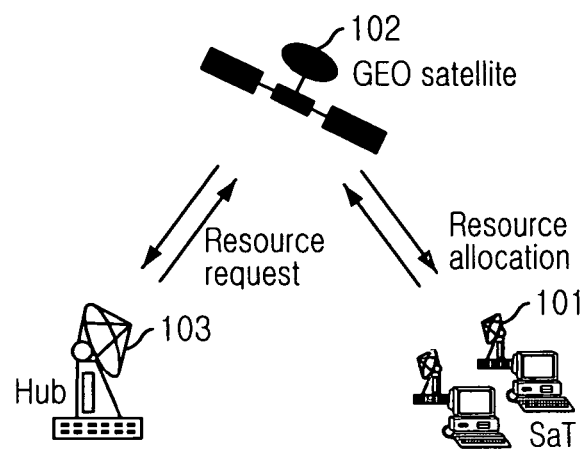
FIG. 1 shows a diagram illustrating a configuration of an interactive satellite multimedia system.

FIG. 1 shows a diagram illustrating a configuration of an interactive satellite multimedia system to which the present invention is applied.

As shown in FIG. 1, the interactive satellite multimedia system is a satellite network, in which a plurality of terminals (SaT) 101 request an earth station 103, e.g., Hub, via a satellite 102 to receive a service, and in response to this, the Hub 103 provides the terminals 101 with the requested service via the satellite 102.

Specifically, the terminals 101 request the Hub 103 to get necessary resource and employ only resources, i.e., timeslots, allowed by the Hub 103. The Hub 103 collects resource requests from the terminals 101, decides timeslots to be allocated to each of the terminals 101, and then reports the same to the terminals 101 via the satellite 102. In this arrangement, the resource for allocation corresponds to a frequency band used in a return link towards the satellite 102 from the terminals 101, which, that is, indicates a packet of a finite number of timeslots in the return link based on the MT-TDMA. To provide this resource allocation plan every super-frame promptly, a timeslot assignment problem (TAP) is reconstructed with two sub-problems: an allocation amount decision problem for each terminal and a timeslot selection problem for selecting timeslots to be allocated to each terminal based on the decided allocation amount. By doing so, the process speed can be improved considerably.

Hereinafter, there will be defined various parameters utilized in the following detailed description. First of all, CS terminals indicate terminals in a location where there exists no radio wave obstacle, and RF terminals denote terminals in a location where there exist radio wave obstacles. The parameters are as follows:

$R_c$: a set of active CS terminals
$R_r$: a set of active RF terminals
R: a set of active terminal ($R=R_c \cup R_r$)
$R_c$: a set of active CS terminals with $$\max\left\{m_j \sum_{k \in C} m_{jk}\right\} N_r$$

$C_i$: a set of ith data class, $C=(C_1, C_2, \ldots)$
$\bar{b}$: the total time-the number of frequency block $T_{sf} \times W_f$ ($\bar{b} = b_c + b_r$)
$b_c$: the number of time-frequency block $T_{sf} \times W_f$ used in creating CS frames for CS terminals
$b_r$: the number of time-frequency block $T_{sf} \times W_f$ used in creating RF frames for RF terminals
$N_c$: the number ($=n_c \times n_{ct}$) of CS traffic timeslots for CS terminals created by one CS time-frequency block $T_{sf} \times W_f$
$N_r$: the number ($=n_r \times n_{rt}$) of RF traffic timeslots for RF terminals created by one RF time-frequency block $T_{sf} \times W_f$
S: a set of traffic timeslots ($S=S_c \cup S_r$)
$S_c$: a set of CS traffic timeslots, $S_c=\{1, \ldots, N_c \times b_c\}$
$S_r$: a set of RF traffic timeslots, $S_r=\{N_c \times b_c+1, \ldots, N_c \times b_c + n_b \times N_r \times b_r\}$
$F'_c$: a set of tth CS traffic timeslots created by each CS time-frequency block $T_{sf} \times W_f$ ($t=1, \ldots, N_c$)
$F'_r$: a set of tth RF traffic timeslots created by each RF time-frequency block $T_{sf} \times W_f$ ($t=1, \ldots, N_r$)
$d_{jk}$: the number of traffic timeslots requested in a Hub for transmission of class k data from terminal j
$Q^c_j$: the maximum timeslot number that can be allocated to CS terminal j ($Q^c_j \leq N_c$, $j \in R_c$)
$Q^r_j$: the maximum timeslot number that can be allocated to RF terminal j ($Q^r_j \leq N_r$, $j \in R_r$)
$w_{jk}$: a weight for class k data from terminal j
$a_{jk}$: the minimum value of a ratio of demand amount of class k data from terminal j to timeslot allocation amount
$m_{jk}$: the minimum timeslot allocation amount necessary in class k data from terminal j ($m_{jk}=[a_{jk}d_{jk}]$)
$m_j$: the minimum timeslot allocation amount for terminal j ($m_j=\max\{m^a_j, m^b_j\}$)
$m^a_j$: the minimum timeslot allocation amount necessary for communication between terminals and Hub
$\beta_j$: a threshold value about a probability of maintaining timeslot number not transmitted from terminals but lost below a given value
$m^b_j$: the minimum timeslot allocation amount necessary for accomplishing the given threshold value $\beta_j$ As mentioned above, $S_c$ indicating a set of traffic timeslots for CS terminals and $S_r$ denoting a set of traffic timeslots for RF terminals are determined by $b_c$ that is the number of time-frequency block $T_{sf} \times W_f$ used in creating frames for CS terminals and $b_r$ that is the number of time-frequency block $T_{sf} \times W_f$ used in producing frames for RF terminals. That is, $S_c$ indicating a set of traffic timeslots for CS terminals may be represented as: $S_c=\{1, \ldots, N_c \times b_c\}$, and $S_r$ denoting a set of traffic timeslots for RF terminals may be defined as: $S_r=\{N_c \times b_c+1, \ldots, N_c \times b_c+n_b \times N_r \times b_r\}$.

First of all, the timeslot assignment problem (TAP) for the optimal timeslot allocation based on the quality of service (QoS) to solve in the present invention minimizes a weighed sum as:

$$\sum_{j \in R} \sum_{k \in C} w_{jk} \cdot \max\left\{d_{jk} - \sum_{i \in S} x_{ijk}, 0\right\} \quad \text{Eq. (1)}$$

Wherein, in Equation (1), $X_{ijk}$ is a variable of binary integer representing whether or not timeslot allocation was made. This means that a traffic timeslot i was allocated to a class k of a terminal j if $x_{ijk}=1$, and not allocated if $x_{ijk}=0$. Further, $$\sum_{i \in S} x_{ijk}$$

represents a total number of timeslots allocated to the class k data of the terminal j, and $$\max\left\{d_{jk} - \sum_{i \in S} x_{ijk}, 0\right\}$$

indicates a number of timeslots that are not fulfilled by the timeslot allocation in the class k data of terminal j.

Thus, it is most preferable to fulfill all demands requested by each terminal, and if otherwise, it is desirable to minimize the number of demands not fulfilled. However, at this time, since the degree of an importance of demand fulfillment may differ according to a type of each terminal or a type of data class, it would be more preferable in the system to minimize a weighted sum that takes account of a priority of each terminal and a priority of each data class, rather than minimizing a sum of demands not fulfilled merely. Of course, if it is assumed that all weights are identical, it would be the same as the case of minimizing the sum of demands not fulfilled simply.

In view of the foregoing, therefore, the problem TAP for the optimal timeslot allocation based on the quality of service of the present invention is standardized as a mathematical model as follows:

Eq. (2)

$$\text{Min} \sum_{j \in R} \sum_{k \in C} w_{jk} \cdot \max\left\{d_{jk} - \sum_{i \in S} x_{ijk}, 0\right\} \quad (1)$$

$$\text{s.t.} \sum_{j \in R} \sum_{k \in C} x_{ijk} \leq 1, \forall i \in S \quad (2)$$

$$\sum_{i \in S_c} \sum_{k \in S} x_{ijk} \leq Q_j^c (\leq N_c), \forall j \in R_c \quad (3)$$

$$\sum_{i \in S_r} \sum_{k \in C} x_{ijk} \leq Q_j^r (\leq N_r), \forall j \in R_r \quad (4)$$

$$z_j \sum_{i \in S_c} \sum_{k \in C} x_{ijk} + (1 - z_j) \sum_{i \in S_r} \sum_{k \in C} x_{ijk} = 0, \forall j \in R \quad (5)$$

$$\sum_{i \in F_c^t} \sum_{k \in C} x_{ijk} \leq 1, \forall j \in R, t = 1, \ldots, N_c \quad (6)$$

$$\sum_{i \in F_r^t} \sum_{k \in C} x_{ijk} \leq 1, \forall j \in R, t = 1, \ldots, N_r \quad (7)$$

$$\sum_{i \in S} x_{ijk} \geq m_{jk}, \forall j \in R, k \in C \quad (8)$$

$$\sum_{i \in S} \sum_{k \in C} x_{ijk} \geq m_j^a, \forall j \in R \quad (9)$$

$$P_j\left(\sum_{i \in S} \sum_{k \in C} x_{ijk}\right) \geq \beta_j, \forall j \in R \quad (10)$$

$$b_c + b_r = \overline{b} \quad (11)$$

$$z_j = 1, \forall j \in R_r \quad (12)$$

$$z_j = 0, \forall j \in R_c' \quad (13)$$

$$z_j = 0 \text{ or } 1, \forall j \in R_c \quad (14)$$

$$x_{ijk} = 0 \text{ or } 1, \forall i \in S, j \in R, k \in C \quad (15)$$

$$b_c, b_r: \text{ nonnegative integers.} \quad (16)$$

Where $z_j$ is a variable of binary integer, meaning that RF timeslots are allocated to the terminal j if $z_j=1$, and CS timeslots if $z_j=0$.

In Equation (2) above, a numeral '2' means that one timeslot must not be allocated over twice, a numeral '3' represents that the number of timeslots allocated to data of CS terminal j must not be larger than a maximum value $Q_j^c$ ($\leq N_c$), and a numeral '4' indicates that the number of timeslots allocated to data of RF terminal j must not be more than a maximum value $Q_j^r (\leq N_r)$. And a numeral '5' represents that one terminal must not use timeslots for CS terminal and timeslots for RF terminal together, and numerals '6' and '7' stand for that more than two timeslots using a same time domain must not be allocated to one terminal. Next, a numeral '8' means that the number of timeslots allocated to the class k data of the terminal j must be greater than a minimum request amount $m_{jk}$, and a numeral '9' represents that the number $$\sum_{i \in S} \sum_{k \in C} x_{ijk}$$

of timeslots allocated to the terminal j must be more than a minimum request amount $m_j^a$. Further, a numeral '10' represents that when the number $$\sum_{i \in S} \sum_{k \in C} x_{ijk}$$

of timeslots is allocated to the terminal j, $$P_j\left(\sum_{i \in S} \sum_{k \in C} x_{ijk}\right),$$

meaning a probability that the number of timeslots that are not transmitted but lost in the terminal j is less than a given allowable value L, must be more than a threshold value $\beta_j$ and may be modified into the form of $$\sum_{i \in S} \sum_{k \in C} x_{ijk} \geq m_j^b. \qquad 5$$

And, a numeral '11' represents that a sum of time-frequency blocks used in creating frames for CS terminal and RF terminal is a total number of time-frequency blocks, $\bar{b}$, a numeral '12' means that only RF timeslots must be allocated to RF terminal, and a numeral '13' represents that CS timeslots must be allocated to terminal $j \in R_c'$. At this time, since the numeral '13' is satisfied by the numerals '6' and '7' automatically if the numeral '8' and '9' are met, it may be omitted but is added to elevate the understanding of the model used in the invention.

In the meantime, the timeslot allocation must be made every super-frame in real time; and thus, its solution must be derived within a very fast time. However, Equation (2) representing the problem TAP for the optimal timeslot allocation based on the quality of service indicates a nonlinear integer programming problem, wherein a variable of binary integer, $x_{ijk}$, has the number of $2^{|S| \cdot |R| \cdot |C|}$, and a variable of binary integer, $z_i$, has the number of $2^{|R|}$. Further, there exist many solutions having a same destination value in view of characteristic of the problem in Equation (2) above. For instance, although $1^{st}$ to $10^{th}$ timeslots or $10^{th}$ to $100^{th}$ timeslots are assigned to a terminal 1, their destination value is identical. Thus, the present invention divides the problem TAP in Equation (2) above into two sub-problems, i.e., an allocation amount decision problem for each terminal and a timeslot selection problem for selecting timeslots to be allocated to each terminal based on the decided allocation amount, thereby enhancing the process speed considerably.

Figure 2:
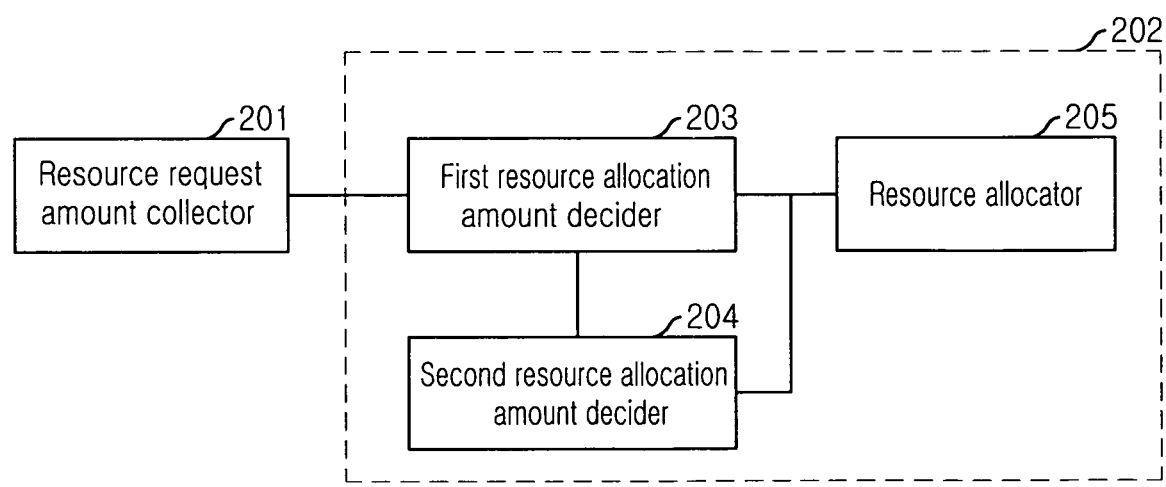
FIG. 2 is a block diagram depicting a configuration of one embodiment of a resource allocation apparatus in accordance with the present invention.

FIG. 2 shows a configuration of one embodiment of a resource allocation apparatus in accordance with the present invention.

As shown in FIG. 2, the resource allocation apparatus in accordance with the present invention installed in the Hub 103 of FIG. 1 comprises a resource request amount collector 201, and an optimal resource allocator 202. The optimal resource allocator 202 includes a first resource allocation amount decider 203, a second resource allocation amount decider 204, and a resource allocator 205.

The resource request amount collector 201 accumulates an amount of resource requests produced during a super-frame interval for each of the terminals 10 and reports the result to the optimal resource allocator 202. After reporting the result, it is reset at zero; and then it again starts to accumulate resource request amount being created when a next super-frame starts.

The first resource allocation amount decider 203 decides the number of timeslots to be allocated to each class of each terminal using the following equation (3) representing a reduced timeslot assignment problem (RTAP), by considering a priority of each terminal and a priority of each data class.

Meanwhile, the second resource allocation amount decider 204 determines the number of timeslots to be allocated to each class of each terminal using the following equation (4), among timeslots being remained after the decision in the first resource allocation amount decider 203.

Thereafter, the resource allocator 205 allocates the decided timeslots to each corresponding class of each terminal using the following equation (5).

Figure 3:
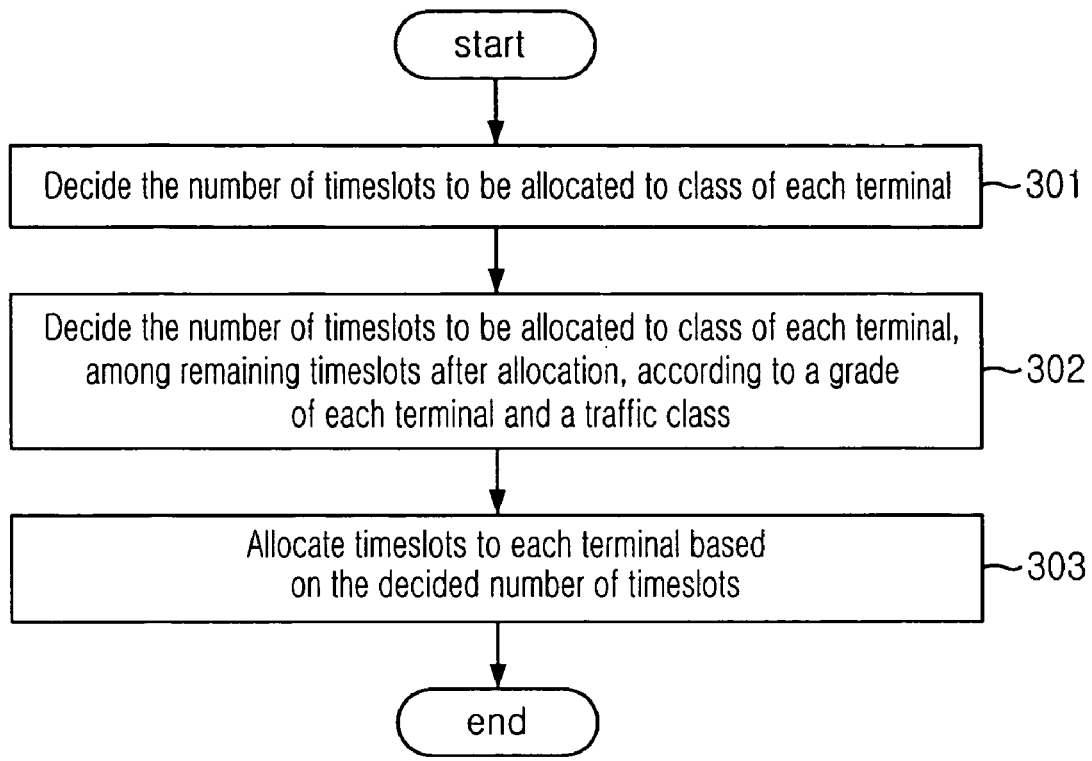
FIG. 3 presents a flowchart depicting one embodiment of a resource allocation method in accordance with the present invention.

FIG. 3 offers a flow chart illustrating one embodiment of a resource allocation method in accordance with the present invention.

As depicted in FIG. 3, first, the resource allocation method of the invention decides the number of timeslots to be allocated to each class of each terminal at step 301. In other words, for instance, it decides the number of timeslots, $y_{jk}$, to be allocated to the class k of the terminal j through the use of an algorithm of Equation (3) as:

Eq. (3)

(*RTAP*: Reduced Timeslot Assignment Problem)

$$\text{Min} \sum_{j \in R} \sum_{k \in C} w_{jk} \cdot \max\{d_{jk} - y_{jk}, 0\} \qquad (17)$$

$$\text{s.t.} \sum_{k \in C} y_{jk} \leq Q_j^c, \forall\, j \in R_c \qquad (18)$$

$$\sum_{k \in C} y_{jk} \leq Q_j^r, \forall\, j \in R_r \qquad (19)$$

$$\sum_{j \in R}(1 - z_j)\sum_{k \in C} y_{jk} \leq b_c \times N_c \qquad (20)$$

$$\sum_{j \in R} z_j \sum_{k \in C} y_{jk} \leq n_b \times b_r \times N_r \qquad (21)$$

$$y_{jk} \geq m_{jk}, \forall\, j \in R, k \in C \qquad (22)$$

$$b_c + b_r = \bar{b} \qquad (23)$$

$$z_j = 1, \forall\, j \in R_r \qquad (24)$$

$$z_j = 0, \forall\, j \in R_c' \qquad (25)$$

$$z_j = 0 \text{ or } 1, \forall\, j \in R_c \qquad (26)$$

$$y_{jk}, b_c, b_r: \text{ nonnegative integers}, \forall\, j \in R, k \in C. \qquad (27)$$

In Equation (3), a numeral '17' represents an equation to decide $y_{jk}$ that minimizes a difference, i.e., non-fulfillment amount, between a requested amount and an allocated amount, a numeral '18' indicates that timeslots of the maximum number $Q_j^c (\leq N_c)$ can be allocated to CS terminals, a numeral '19' means that timeslots of the maximum number $Q_j^r (\leq N_r)$ can be allocated to RF terminals, a numeral '20' denotes a constraint equation of the number of timeslots that can be allocated to all of CS terminals, a numeral '21' indicates a constraint equation of the number of timeslots that can be allocated to all of RF terminals, a numeral '22' represents a minimum allocation amount guaranteed in each terminal, and a numeral '23' indicates a sum of channel numbers for CS terminals and RF terminals.

Next, the process of the invention decides the number of timeslots to be allocated to each class of each terminal among timeslots being remained after the allocation, according to a grade of each terminal and a traffic class at step 302. That is, the number of timeslots to be allocated to the class k of the terminal j, $y_{jk}^F$, is decided using the following equation (4), out of the timeslots being remained after the allocation in the step 301. This is done in the direction of decreasing a loss probability of timeslots. In the meantime, it should be appreciated that Equation (4) is merely one embodiment, but various algorithms may be used relying upon a grade of each terminal and a traffic class.

(FTAP: Free Timeslot Assignment Problem)                                    Eq. (4)

$$\text{Max min}\left\{\frac{1}{w_j}P_j\left(\sum_{k\in C}(y^*_{jk}+y^F_{jk})\right)\right\} \quad (30)$$

$$\text{s.t.} \sum_{k\in C}(y^*_{jk}+y^F_{jk}) \le Q^c_j, \forall\, j \in R_c \quad (31)$$

$$\sum_{k\in C}(y^*_{jk}+y^F_{jk}) \le Q^r_j, \forall\, j \in R_r \quad (32)$$

$$\sum_{j\in R^c_c}\sum_{k\in C}(y^*_{jk}+y^F_{jk}) \le b^*_c \times N_c \quad (33)$$

$$\sum_{j\in R-R^c_c}\sum_{k\in C}(y^*_{jk}+y^F_{jk}) \le n_b \times b^*_r \times N_r \quad (34)$$

$y^F_{jk}$: nonnegative integers, $\forall\, j \in R, k \in C.$ (35)

Wherein $y^F_{jk}$ represents the number of timeslots allocated to the class k of the terminal j among the remaining timeslots, and $W_j$ indicates a weight for the terminal j used when allocating the remaining timeslots. Further, in Equation (4), a numeral '30' represents a loss probability for the remaining timeslots after the allocation amount decision, a numeral '31' stands for that if a terminal is of CS type, an allocation amount for the CS terminal can't exceed the maximum allocation amount, a numeral '32' means that if a terminal is of RF type, an allocation amount for the RF terminal can not be beyond the maximum allocation amount, a numeral '33' represents that a total allocation amount of remaining timeslots for CS terminals can not be over a total timeslot number of CS channels, and a numeral '34' indicates that a total allocation amount of remaining timeslots for RF terminals can't exceed a total timeslot number of RF channels.

Thereafter, at step 303, the process of the invention allocates timeslots to each terminal based on the number of timeslots to be allocated to each class of each terminal decided at the steps 301 and 302. That is, with $y_{jk}$ and $y^F_{jk}$ decided at the steps 301 and 302, the timeslots may be scheduled by the following equation (5) as:

Procedure PTAP                                                              Eq. (5)

Step 1. (RF timeslot scheduling)

$r = 0;$

FOR($\forall\, j \in R_r + R_c - R^c_c, \forall\, k \in C$){

FOR($i = r, i \le y^*_{jk} + y^{F*}_{jk}; i++$){$x_{ijk} = 1.$}

$r = r + y_{ik}.$

}

Step 2. (CS timeslot scheduling)

$r = 0;$

FOR($\forall\, j \in R^c_c, \forall\, k \in C$){

FOR($i = r, i \le y^*_{jk} + y^{F*}_{jk}; i++$){$x_{ijk} = 1.$}

$r = r + y_{jk}.$

Specifically, first, a specific timeslot is allocated by a timeslot allocation amount for each class of each terminal. For this, a certain number for each of RF timeslot and CS timeslot is given according to a time and a frequency. That is, for each of CS timeslot and RF timeslot, the number "0" is given to a timeslot of the lowest frequency and the earliest time period, and the numbers "$b_c^* \times N_c - 1$ and $n_b \times b_r^* \times N_r - 1$" are given to a timeslot of the highest frequency and the latest time period. In Equation (5), $y_{jk}^*$ is a value created by Equation (3) above, and $y_{jk}^{F*}$ is a value obtained by Equation (4) above.

Figure 4:
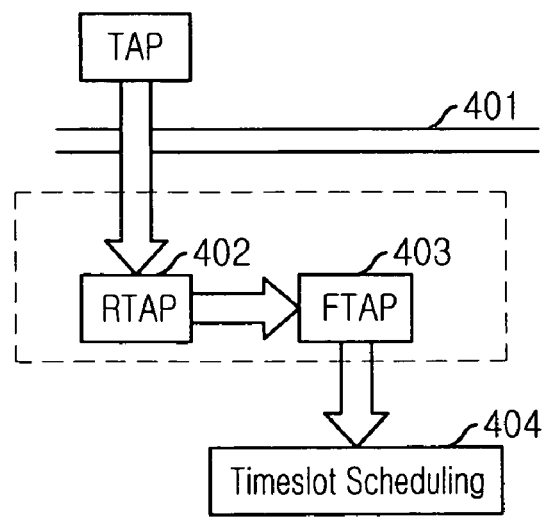
FIG. 4 provides a flowchart showing another embodiment of a resource allocation method in accordance with the present invention.

FIG. 4 depicts a flow chart illustrating another embodiment of the resource allocation method in accordance with the present invention.

As depicted in FIG. 4, the resource allocation method of the invention divides the problem TAP for the optimal timeslot allocation based on the quality of service into the sub-problems at step 401. This is based on the principle that the problem TAP is a nonlinear integer programming problem, and thus there exist many solutions with a same destination value in view of characteristic of such problem.

Next, the process of the invention decides the number of timeslots, $y_{jk}$, to be allocated to the class k of the terminal using Equation (3) above at step 402. That is, this solves an allocation amount decision problem (RTAP) for each terminal, out of the divided sub-problems.

Then, the process of the invention decides the number of timeslots to be allocated to each class of each terminal among timeslots being remained after the allocation, according to a grade of each terminal and a traffic class at step 403. That is, this solves a free timeslot assignment problem (FTAP).

Subsequently, the process of the invention chooses and allocates timeslots to be allocated to each terminal based on the decided allocation amount. In other words, the timeslots can be scheduled to each terminal using Equation (5) above.

Hereinafter, the experimental results of the resource allocation method in accordance with the present invention will be described in detail.

The data class takes account of both delay class $k_1$ and service type class $k_2$, and the key data used in the performance analysis is as follows. First of all, it is assumed that the number of each of a delay class and a service type class is 5, and the numbers of RF terminals and CS terminals is 150 and 90, respectively. And, it is also assumed that parameters for deciding a structer of super-frame are $\bar{b}=4$, $n_c=16$, $n_d=2000$, $n_r=10$, $n_b=8$, $n_{rr}=250$, etc. Next, a demand for a delay and a service type class of each terminal is as follows: if $k_1-1$, then $d_{j(k_q,k_2)}$ is crated for a uniformity distribution U (lower limit, upper limit) with a probability of 1/period, and $d_{j(k_1,k_2)}$ is the lower limit with a probability of (1-1/period); and if $k_1 \ge 2$, then $d_{j(k_1,k_2)}$ is $$\left\lfloor \frac{1}{k_1^2} \times d_{j(k_1-1,k_2)} \right\rfloor.$$

Further, the lower limit, the upper limit, and the period for each service type class are defined in the following Table 1.

TABLE 1

| Service type class | Lower limit | Upper limit | Period |
|---|---|---|---|
| 1 | 20 | 100 | 200 |
| 2 | 20 | 60 | 50 |
| 3 | 20 | 300 | 15 |

TABLE 1-continued

| Service type class | Lower limit | Upper limit | Period |
|---|---|---|---|
| 4 | 20 | 450 | 12 |
| 5 | 20 | 800 | 6 |

Furthermore, $a_{j(k_1,k_2)}$ is defined as follows. That is, if $$k_2 > \frac{|C_2|}{2} + 1,$$

then it is assumed that $a_{j(k_1,k_2)}$ is 0.7, and if $$k_2 \leq \frac{|C_2|}{2} + 1,$$

then it assumed that $a_{j(k_1,k_2)}$ is 0.5. And, it assuemd that $Q_j^r$, $j \in R_r$ and $Q_j^r$, $j \in R_c$ are $N_r$ and $N_c$, respectively, and $m_j^a = m_r^b = 100$ $j \in R$, $w_{jk} = M + (k_1-1)|C_2| + k_2$, $j \in R_r$, $w_{jk} = (k_1-1)|C_2| + k_2$, $j \in R_r$. Herein, M has a relatively very large number compared to other numbers. Further, it is assumed that $w_j$ and $\beta_j$ are identical for all terminals j, and the amount of data that is currently waiting for in a buffer is the same as the number of available timeslots for all the terminals j.

First of all, the result of the timeslot allocation in accordance with the resource allocation method of the invention is shown in the following Table 2 as:

TABLE 2

| Classi-fication | Total number of timeslots | Gap | Fulfillment ratio | Allocation ratio | Optimal condition |
|---|---|---|---|---|---|
| RF | 60000 ($b^+_r = 3$) | 0.0! | 1.0+ | 1.21816‡ | B!! |
| CS | 32000 ($b^+_c = 1$) | 0.0! | 1.0++ | 1.24311‡‡ | |
| Total | | | 1.0+++ | 1.17658‡‡‡ | |

Where ! is (target equation value−lower limit)/lower limit, and !! is satisfactory optimal condition. Other marks are defined as:

$$+ \quad \sum_{j \in R}\sum_{k \in C} \min\left\{\frac{y_{jk}}{d_{jk}}, 1\right\} / (|R| \times |C|) \quad \ddagger \quad \sum_{j \in R}\sum_{k \in C} \frac{y_{jk}}{d_{jk}} / (|R| \times |C|)$$

$$++ \quad \sum_{j \in R}\sum_{k \in C} \min\left\{\frac{y_{jk}}{d_{jk}}, 1\right\} / (|R_r| \times |C|) \quad \ddagger\ddagger \quad \sum_{j \in R}\sum_{k \in C} \frac{y_{jk}}{d_{jk}} / (|R_r| \times |C|)$$

$$+++ \quad \sum_{j \in R}\sum_{k \in C} \min\left\{\frac{y_{jk}}{d_{jk}}, 1\right\} / (|R_c| \times |C|) \ddagger\ddagger\ddagger \quad \sum_{j \in R}\sum_{k \in C} \frac{y_{jk}}{d_{jk}} / (|R_c| \times |C|)$$

Through a timeslot set determination procedure (TSDP) that is a procedure of assigning some CS and RF channels, respectively, and then deciding whether or not they are to be used, the numbers of RF timeslots and CS timeslots were decided as 60000 and 32000, respectively, and it is shown that the process result satisfies the optimal condition B. Thus, there was no gap {Gap=(target equation value−lower limit)/lower limit} for all of RF terminals and CS terminals. The fact that the result satisfies the optimal condition B stands for that only CS timeslots could fulfill all timeslots allocated to CS terminals. Lastly, in the fulfillment ratio representing a ratio of requested demand to fulfillment, it is shown that an average fulfillment ratio of each of whole terminals, CS terminals, and RF terminals was 1.0 all. And, in the allocation ratio indicating a ratio of requested demand to actually allocated timeslot number, it is shown that an average allocation ratio of each of whole terminals, CS terminals, and RF terminals was 1.22, 1.24, and 1.77, respectively. The reason that the allocation ratio was greater than 1 is because a sum of timeslot demands of each terminal was less than an available timeslot number and thus the remaining timeslots after fulfilling the demand were allocated to each terminal additionally.

Next, the timeslot allocation result in accordance with the resource allocation method of the invention where a period for each service type class is varied is represented as the following Table 3.

TABLE 3

| | | Optimal | | Gap | | Fulfillment ratio | | |
|---|---|---|---|---|---|---|---|---|
| Period | $b^*_r$ | $b^*_c$ | condition | RF | CS | Total | RF | CS |
| Reference values+*0.7 | 3 | 1 | B++ | 0.0 | 0.0 | 1.0 | 1.0 | 1.0 |
| Reference values+*0.6 | 3 | 1 | — | 0.0 | 0.000181 | 0.99918 | 1.0 | 0.99780 |
| Reference values+*0.5 | 3 | 1 | A | 0.0 | 0.0 | 0.95061 | 0.99632 | 0.87443 |
| Reference values+*0.4 | 3 | 1 | A | 0.0 | 0.0 | 0.79702 | 0.79763 | 0.79600 |

+a period given in Table 1 above

++a satisfactory optimal condition

In Table 3 early, the reference value in the period means the values given in Table 1 above, and it can be seen that as a period for each service type class decreases, the fulfillment ratio decreases. Meanwhile, it can be affirmed that the resource allocation method in accordance with the present invention can derive an optimal solution or an executable solution with Gap being very small, regardless of the period for each service type class, that is, regardless of an amount of the demand.

Thereafter, the timeslot allocation result in accordance with the resource allocation method of the invention where the minimum timeslot allocation number is varied is shown in the following Table 4. That is, it represents the timeslot allocation result according to a variation of the minimum timeslot allocation amount $m_j$ necessary for communication between the terminals and the Hub. Herein, the period is the reference value*0.5.

TABLE 4

| $m_j$ | $b^*_r$ | $b^*_c$ | Optimal condition | Gap RF | Gap CS | Fulfillment ratio Total | Fulfillment ratio RF | Fulfillment ratio CS |
|---|---|---|---|---|---|---|---|---|
| 100 | 3 | 1 | A | 0.0 | 0.0 | 0.95061 | 0.99632 | 0.87443 |
| 150 | 3 | 1 | A | 0.0 | 0.0 | 0.95304 | 0.98126 | 0.90600 |
| 200 | 3 | 1 | A | 0.0 | 0.0 | 0.92004 | 0.93458 | 0.89580 |

As shown in Table 4 above, it can be seen that the resource allocation method in accordance with the present invention can derive an optimal solution or an executable solution with Gap being very small, regardless of a variation of the minimum timeslot allocation number.

On the other hand, it can be confirmed that the solution in the resource allocation method in accordance with the present invention can be derived within an average computation time of 5 ms, in case of using a computer of Pentium IV 2.0 GHz.

As mentioned above, the resource allocation method of the present invention may be implemented by a software program and may be stored in storage medium such as CD-ROM, RAM, ROM, floppy disk, hard disk, optical magnetic disk, etc., which are readable by a computer.

As a result, the present invention as disclosed early can guarantee the maximum throughput by processing timeslots in the return link to the satellite from the terminals based on the MF-TDMA promptly. Thus, the present invention can reduce the unit cost for communication and also can maximize the business profit.

The present application contains subject matter related to Korean patent application No. 2004-0104795, filed in the Korean Intellectual Property Office on Dec. 13, 2004, the entire contents of which is incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A method of allocating resources in an interactive satellite communication system employing a problem decomposition technique, comprising the steps of:

a) accumulating an amount of resource requests being created during a super-frame period for each terminal;

b) deciding a resource allocation amount to be allocated to each class of each terminal, depending on a preset weight to minimize a difference from the accumulated resource request amount for each class of each terminal; and c) selecting and mapping timeslots to be allocated to said each terminal based on the decided resource allocation amount, wherein said class is defined as being either a clear-sky terminal where no radio wave obstacle exists or a rain-fade terminal where radio wave obstacles do exist.

2. The method as recited in claim 1, further comprising the step of deciding a timeslot allocation amount to be allocated to said each class of said each terminal additionally, among timeslots being remained after the decision process in the step b), based on a grade of said each terminal and a traffic class.

3. The method as recited in claim 1, wherein the step b) decides the resource allocation amount to be allocated to said each class of said each terminal by taking account of the preset weight to minimize the difference from the accumulated resource request amount, based on a maximum and a minimum allocation amount to be allocated to said each terminal and a sum of channel numbers according to said each class of said each terminal.

4. An apparatus for allocating resources in an interactive satellite communication system employing a problem decomposition technique, comprising:

means for accumulating an amount of resource requests being created during a super-frame period for each terminal;

a first resource allocation amount decision means for deciding a resource allocation amount to be allocated to each class of each terminal, depending on a preset weight to minimize a difference with the accumulated resource request amount for each class of each terminal; and a resource allocation means for selecting and mapping timeslots to be allocated to said each terminal based on the decided resource allocation amount wherein said class is defined as being either a clear-sky terminal where no radio wave obstacle exists or a rain-fade terminal where radio wave obstacles do exist.

5. The apparatus as recited in claim 4, further comprising a second resource allocation amount decision means for deciding a timeslot allocation amount to be allocated to said each class of said each terminal additionally, among timeslots being remained after the decision operation in the first resource allocation amount decision means, based on a grade of said each terminal and a traffic class.

6. The apparatus as recited in claim 4, wherein the first resource allocation amount decision means decides a resource allocation amount to be allocated to said each class of said each terminal by taking account of a preset weight to minimize the difference from the accumulated resource request amount, based on a maximum and a minimum allocation amount to be allocated to said each terminal and a sum of channel numbers according to a class of said each terminal.

* * * * *